United States Patent [19]
Heinzelman et al.

[11] Patent Number: 5,398,369
[45] Date of Patent: Mar. 21, 1995

[54] TOOTHBRUSH WITH PLIABLE PRESSURE PAD

[75] Inventors: Bert D. Heinzelman, Tenafly, N.J.; Donald R. Lamond, Long Beach; Robert Pandorf, New York, both of N.Y.

[73] Assignee: Chesebrough-Pond's USA Co., Division of Conopco, Inc., Greenwich, Conn.

[21] Appl. No.: 271,696

[22] Filed: Jul. 7, 1994

[51] Int. Cl.⁶ .............................................. A46B 9/04
[52] U.S. Cl. ................... 15/167.1; 15/143.1; 16/111 R; 81/489; D4/104; D4/138
[58] Field of Search ............... 15/143.1, 167.1, 167.2; 16/110 R, 111 R, DIG. 12; 81/489; D4/104, 138

[56] References Cited

U.S. PATENT DOCUMENTS

| D. 328,977 | 9/1992 | Halm | D4/104 |
|---|---|---|---|
| D. 334,288 | 3/1993 | Witzig-Jaggi | D4/104 |
| D. 342,160 | 12/1993 | Curtis et al. | D4/104 |
| D. 342,162 | 12/1993 | Curtis et al. | D4/104 |
| 2,179,266 | 11/1939 | Lukenbill | 15/167.1 |
| 4,283,808 | 8/1981 | Beebe | 15/167.1 |
| 4,721,021 | 1/1988 | Kusznir | 81/489 |
| 5,014,383 | 5/1991 | Costar | 15/167.1 |
| 5,052,071 | 10/1991 | Halm | 15/143.1 |
| 5,054,154 | 10/1991 | Schiffer et al. | 15/143.1 |
| 5,305,490 | 4/1994 | Lundgren | 15/167.1 |
| 5,339,482 | 8/1994 | Desimone et al. | 15/143.1 |

FOREIGN PATENT DOCUMENTS

| 4219253 | 12/1993 | Germany | 81/489 |
|---|---|---|---|
| 4222931 | 12/1993 | Germany . | |
| 4229152 | 3/1994 | Germany . | |
| 396846 | 8/1933 | United Kingdom | 15/143.1 |
| 91-19437 | 12/1991 | WIPO . | |

*Primary Examiner*—Mark Spisich
*Attorney, Agent, or Firm*—Milton L. Honig

[57] ABSTRACT

A toothbrush is described whose handle has a special arrangement. The handle includes an elongated handle arm formed of a plastic having a Shore Hardness value of at least 90. A pressure pad is attached to the arm and formed of an elastomer having a Shore Hardness value no higher than 80. Advantageously, the elongated handle arm has a recess in an area adjacent to connection with the brushhead. The pressure pad is arranged within that recess. At least one radial anti-slip structure, especially a semi-ring shape, protrudes from and circumscribes bottom and lateral surfaces of the arm.

16 Claims, 2 Drawing Sheets

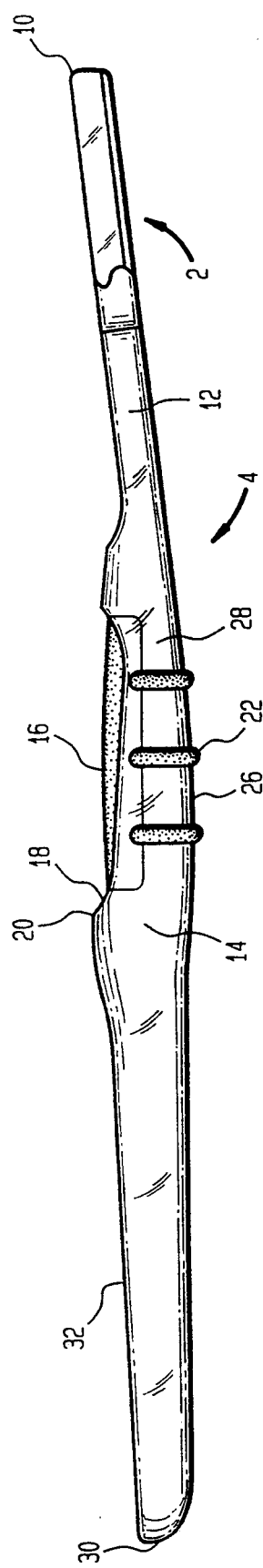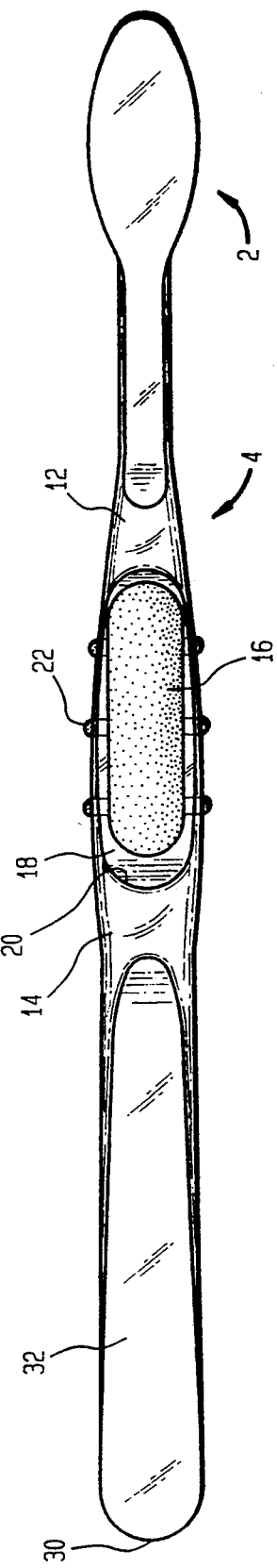

TOOTHBRUSH WITH PLIABLE PRESSURE PAD

BACKGROUND OF THE INVENTION

1. Field of the Invention

The invention relates to a toothbrush with a special handle of dual material construction that conforms to hand pressure, improves grip and has a radial anti-slip benefit.

2. The Related Art

Over the past several years a number of new toothbrushes have been introduced into the market. For instance, the Colgate-Palmolive Company now sells a product known as the *Precision* brush. Besides a special brushhead, the *Precision* product in one version includes a rippled handle whose upper and lower surfaces are covered with a material different from that of the lateral and front portions of the handle. Only small differences in hardness distinguish the upper/lower surface material (86 Shore Hardness) from the lateral/front material (95–100 Shore Hardness). U.S. Pat. No. Des. 342,160 (Curtis et al.) and U.S. Pat. No. Des. 342,162 (Curtis et al.) cover the design aspects of the Colgate-Palmolive product.

A similar design concept has been incorporated into the *Crest Complete* brush, a product of the Procter & Gamble Company. FIG. 1 of WO 91/19437 (Volpenhein et al.) illustrates the *Crest Complete* brush. A substantial portion of both the upper and lower surfaces of the handle are covered by strips of a material (89 Shore Hardness) leaving the lateral sides (95–100 Shore Hardness) uncovered.

Dual material handles have also been introduced by the SmithKline Beecham Corporation under the *Aqua Fresh* trademark. Similar to its competitors, a very substantial part of the upper and lower surfaces of the handle are covered by a material (88 Shore Hardness) different from the remaining material (95–100 Shore Hardness) of the handle. A related brush is illustrated in U.S. Pat. No. Des. 328,977 (Halm).

U.S. Pat. No. Des. 334,288 (Witzig-Jaggi) describes a dual material toothbrush wherein material on an upper surface of the handle exhibits a sloping change of thickness.

Utilization of dual materials has been mainly for aesthetic purposes, and only secondarily meant to improve grippability of the handle.

Flexible walls have also been incorporated into toothbrushes that include hollow reservoirs for stirring and delivering toothpaste. Disclosures of this type of technology may be found in French Patent 2,680,456 (Cristea) and French Patent 2,680,656 (Charpentier).

Another recent development in toothbrush technology has been the use of corrugated handles. WO 93/15627 (Halm) describes a handle with an integral corrugated core surrounded by an elastomeric region. The corrugated core provides resiliency to the handle. This corrugation has also been utilized in DE 4,222,931 (Henkel). Therein is reported a ribbed handle with each of the ribs being of square cross section.

There have been many innovations in this area as can be seen through the above briefly described patents. Nevertheless, there remains room for improved models.

Accordingly, it is an object of the present invention to provide a toothbrush with a handle having sections sufficiently resilient to conform to a users fingers upon application of pressure.

It is another object of the present invention to provide a toothbrush that can be manipulated with less fatigue than typical commercial toothbrushes.

It is still another object of the present invention to provide a toothbrush with a feature that reduces both radial and longitudinal slip and that allows for improved grippability no matter where along a target circumference a user places finger pressure.

SUMMARY OF THE INVENTION

A toothbrush is provided that includes:
- a brushhead with a base and bristle tufts projecting from the base, the brushhead having a first and second end; and
- a handle connected to the second end of the brushhead, the handle including:
  - an elongated handle arm traversing a full length of the handle, the arm being formed of a plastic having a Shore Hardness value of at least 90; and
  - a pressure pad attached to the beam and formed of an elastomer having a Shore Hardness value no higher than 80.

Optimally, the plastic utilized for the arm should have a Shore Hardness value ranging from about 95 to 100. Shore Hardness values for the elastomer of the pressure pad should preferably range from 30 to 75, optimally from 40 to 65. Typical plastics that can be utilized for the present invention are nylon, polyethylene, polycarbonate, polyethylene terephthalate, polyacrylate, polymethylmethacrylate and styrene/acrylonitrile (SAN). Most preferred is SAN. Typical materials for the elastomer are rubber and polyurethane, the former being selected from the group consisting of polyisobutylene, polypropylene and polybutadiene. Most preferred is Santoprene, a grade of polypropylene rubber available from the Monsanto Company, and Buna N rubber.

Advantageously, the handle arm will include a recess in an area adjacent to connection with the brushhead. The recess will best be saddle shaped. The pressure pad is preferably arranged within this recess. One purpose of the recess/pressure pad combination is to identify a target area onto which a user will place a thumb for gripping the handle. By engineering the elastomer to be readily deformable under pressure, a user will experience less strain in manipulating the toothbrush. A material harder than this elastomer would be insufficiently pliable in a user's hand thereby being ergonomically inferior.

Arm areas of the handle are preferably formed from a transparent or at least translucent plastic. Colorants can be added to the plastic. Elastomer used for the pressure pad preferably is opaque. The recess can have a length that ranges from 3 to 30% of the total length of the handle. Preferably the length of the recess will range from 10 to 20% of the total length of the handle.

Another feature that may be included with the toothbrush is that of a radial anti-slip structure on the handle. This structure will protrude from and circumscribe the bottom and both lateral surfaces of the arm. A preferred embodiment of this structure is a semi-ring shape oriented transverse to a longitudinal axis of the handle and of the recess. There may be more than one semi-ring structure, preferably from about 2 to about 6, optimally about 3 such semi-rings.

Mechanically the semi-ring shape has the advantage, in combination with the pressure pad, that a user's grip along the target or recess area will have elastomer surfaces not only on an opposing side but also laterally along edges of the handle. It has been estimated that a significant percentage of the population at some point in their brushing technique grip sides of the toothbrush. Elastomer in the form of a ring provides the user a target area for holding but does not force gripping at any predisposed angular orientation. This allows for holding the toothbrush in a user's most natural or habitual manner.

Manufacture of the toothbrush handle involves formation first of the arm, with appropriate hollow areas for receipt of the elastomer material. Thereafter, the arm is placed into a mold and liquefied elastomer is injected thereinto filling out spaces within the arm and cavity of the mold. The pressure pad and the semi-ring shape anti-roll structures are thereby formed unitarily. Ring shapes are preferred over any other geometry because of easier release of the mold.

BRIEF DESCRIPTION OF THE DRAWING

The above features, advantages and objects of the present invention will more fully be appreciated through the following detailed discussion, reference being made to the drawing consisting of:

FIG. 2 which is a side elevational view of the embodiment according to FIG. 1; and FIG. 3 which is a top plan view of the embodiment according to FIG. 1.

DETAILED DESCRIPTION

Figure 1:
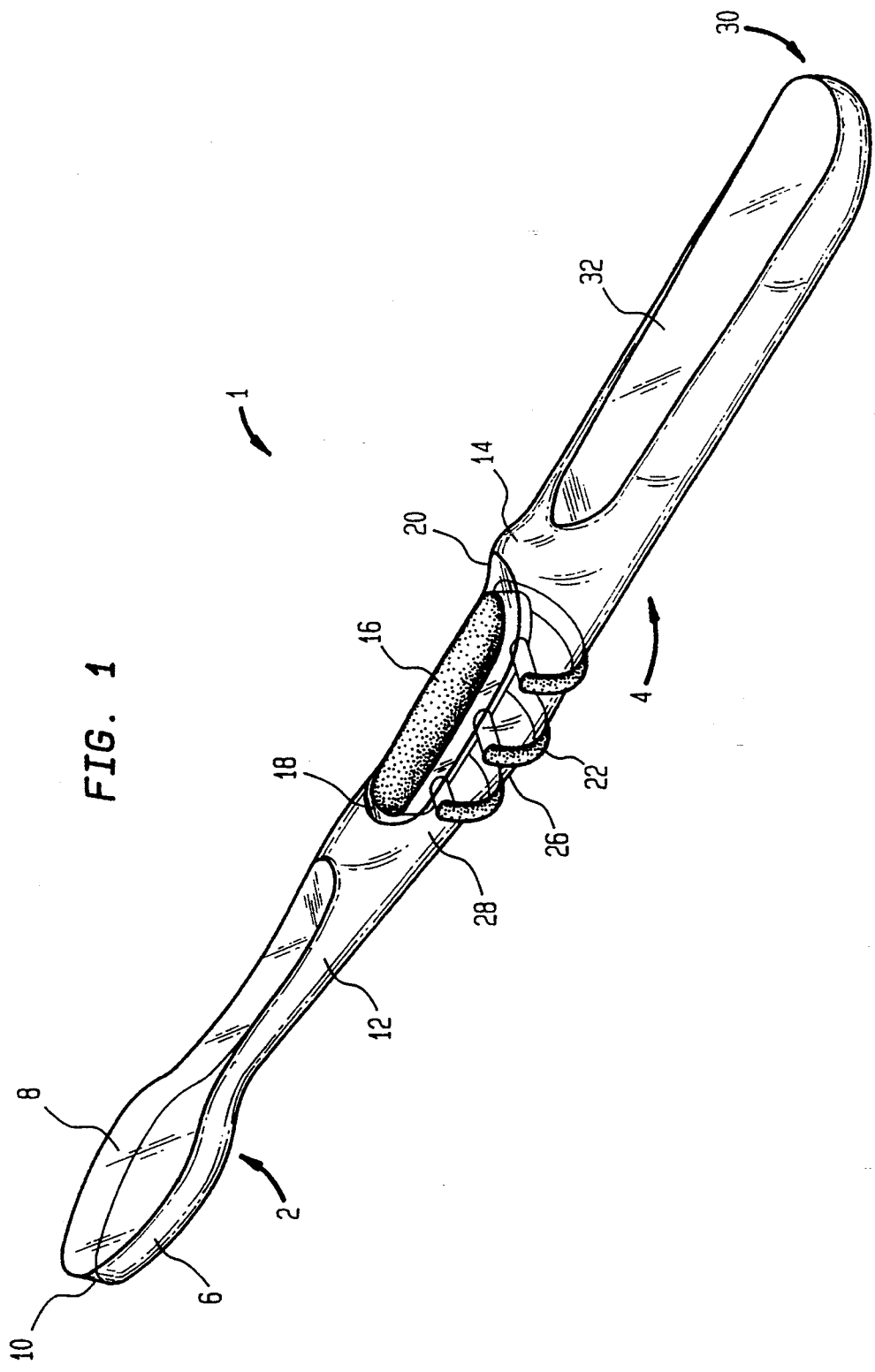
FIG. 1 which is a plan perspective view of one embodiment of the toothbrush according to the present invention.

The Figures illustrate a toothbrush 1 that includes a brushhead 2 and a handle 4. The brushhead 2 has a base 6 and a series of bristle tufts 8. Brushhead 2 is defined by a first end 10 and a second end 12.

Handle 4 includes an elongated handle arm 14 and a pressure pad 16. Elongated handle arm 14 traverses a full length of handle 4. This arm is formed of a plastic having a Shore Hardness value of at least 90. The pressure pad is formed of an elastomer having a Shore Hardness value no higher than 80.

A recess 18 is formed on arm 14 in an area adjacent to connection of the arm with the brushhead. Lengthwise across recess 18 at its widest dimension is formed a mouth 20. Pressure pad 16 is arranged within recess 18 and lies totally within the mouth of the recess.

A series of three radial anti-slip structures in the form of a semi-ring shape 22 protrudes outward from and circumscribes the bottom surface 26 and both lateral surfaces 28 of arm 14.

Adjacent free end 30 of handle 4 is a flat surface 32. This truncated cut forming the flat surface permits easy mounting through a toothbrush holder.

The present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes which come within the meaning and range of equivalency of the claims are to be embraced by their scope.

What is claimed is:

1. A toothbrush comprising:

a brushhead comprising a base and bristle tufts projecting from said base, said brushhead having first and second ends; and a handle connected to said second end of said brushhead, said handle comprising:

an elongated arm traversing a full length of said handle, said arm having a top, bottom and two lateral surfaces with the two lateral surfaces being disposed between and on opposite sides of said top and bottom surfaces, said arm being formed of a plastic having a Shore Hardness value of at least 90;

a recess formed within said top surface of said arm in an area adjacent to connection with said brushhead;

a pressure pad arranged within said recess of said arm as an elongate body along said top surface and formed of an elastomer having a Shore Hardness value no higher than 80; and at least one anti-roll structure protruding from and circumscribing said bottom and lateral surfaces of said arm, said at least one anti-roll structure being positioned to flank and extend below said pressure pad.

2. A toothbrush according to claim 1 wherein said plastic has a Shore Hardness value ranging from 95 to 100.

3. A toothbrush according to claim 1 wherein the elastomer has a Shore Hardness value ranging from 40 to 65.

4. A toothbrush according to claim 1 wherein the recess is saddle shaped and defined by an elongated concave mouth oriented along a longitudinal axis of said arm.

5. A toothbrush according to claim 4 wherein said recess has a length at a mouth thereof that ranges from 3 to 30% of a length of said handle.

6. A toothbrush according to claim 5 wherein said length of said recess ranges from 10 to 20%.

7. A toothbrush according to claim 1 wherein said arm is formed of a transparent plastic.

8. A toothbrush according to claim 1 wherein said elastomer is selected from the group consisting of rubber and polyurethane.

9. A toothbrush according to claim 8 wherein said rubber is selected from the group consisting of polyisobutylene, polypropylene and polybutadiene.

10. A toothbrush according to claim 1 wherein said plastic is selected from the group consisting of nylon, polyethylene, polycarbonate, polyethylene terephthalate, polyacrylate, polymethylmethacrylate and styrene/acrylonitrile.

11. A toothbrush according to claim 1 wherein said pressure pad and said at least one anti-roll structure are of unitary construction.

12. A toothbrush according to claim 1 wherein said at least one anti-roll structure has a plane of symmetry oriented perpendicular to a longitudinal axis of said elongated handle arm.

13. A toothbrush according to claim 1 wherein said at least one anti-roll structure is three in number, each equidistantly spaced from an adjacent anti-roll structure and each of uniform width.

14. A toothbrush comprising:

a brushhead comprising a base and bristle tufts projecting from said base, said brushhead having a first and second end; and a handle connected to said second end of said brushhead, said handle comprising:

an elongated arm formed of a plastic traversing the full length of said handle, said arm having a top, bottom and two lateral outer surfaces with the two lateral surfaces being disposed between and on opposite sides of said top and bottom surfaces;

a recess formed within said top surface of said arm in an area adjacent to connection with said brushhead;

a pressure pad arranged within said recess of said arm as an elongate body along said top surface of said arm; and at least one anti-roll structure protruding from and circumscribing said bottom and lateral surfaces of said arm, said at least one anti-roll structure being positioned to flank and extend below said pressure pad.

15. A toothbrush according to claim 14 wherein said pressure pad and said at least one anti-roll structure are of unitary construction.

16. A toothbrush according to claim 14 wherein the recess is saddle shaped and defined by an elongated concave mouth oriented along a longitudinal axis of said arm.

* * * * *